E. WIARD.
Cultivators.

No. 136,574.

2 Sheets--Sheet 1.

Patented March 4, 1873.

Witnesses.

Inventor
Edward Wiard
by
Munn, Fenwick & Lawrence

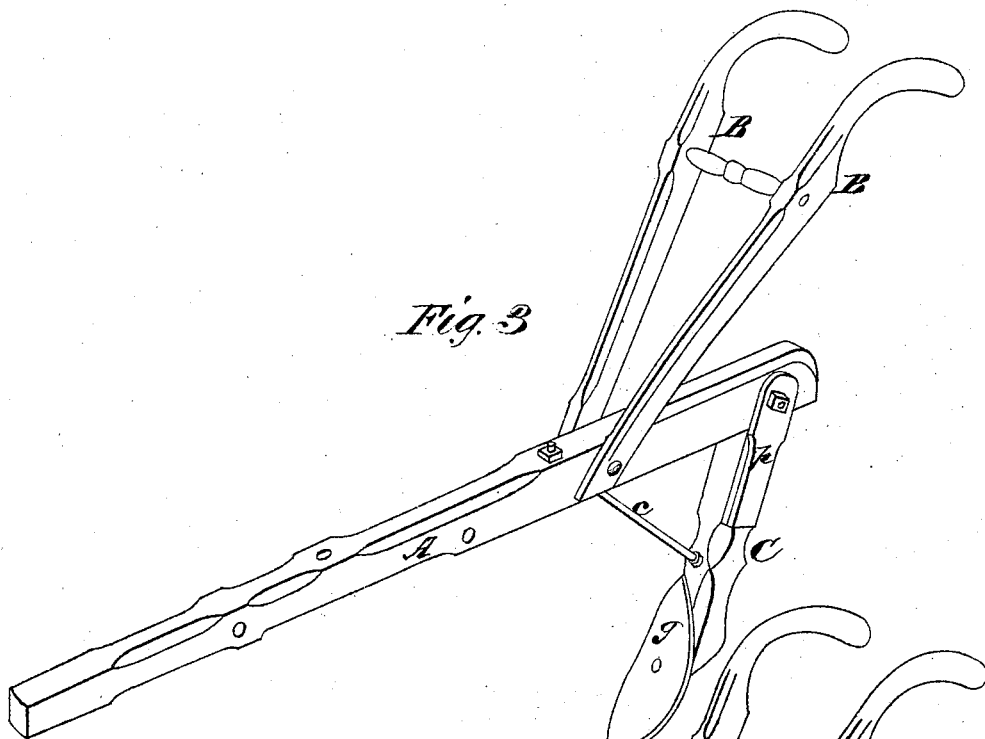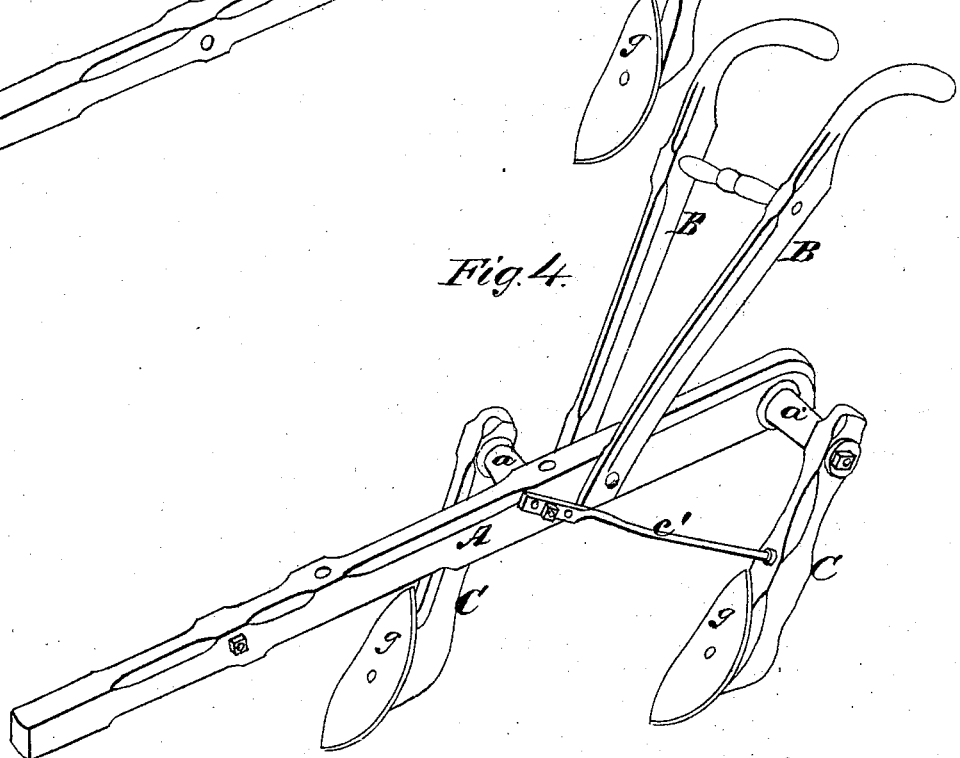

UNITED STATES PATENT OFFICE.

EDWARD WIARD, OF LOUISVILLE, KENTUCKY, ASSIGNOR TO BENJAMIN F. AVERY, OF SAME PLACE.

IMPROVEMENT IN CULTIVATORS.

Specification forming part of Letters Patent No. 136,574, dated March 4, 1873.

*To all whom it may concern:*

Be it known that I, EDWARD WIARD, of Louisville, in the county of Jefferson and State of Kentucky, have invented an Improvement in Cultivators; and I do hereby declare that the following is a full, clear, and exact description thereof, reference being had to the accompanying drawing making a part of this specification, in which—

Figure 1:
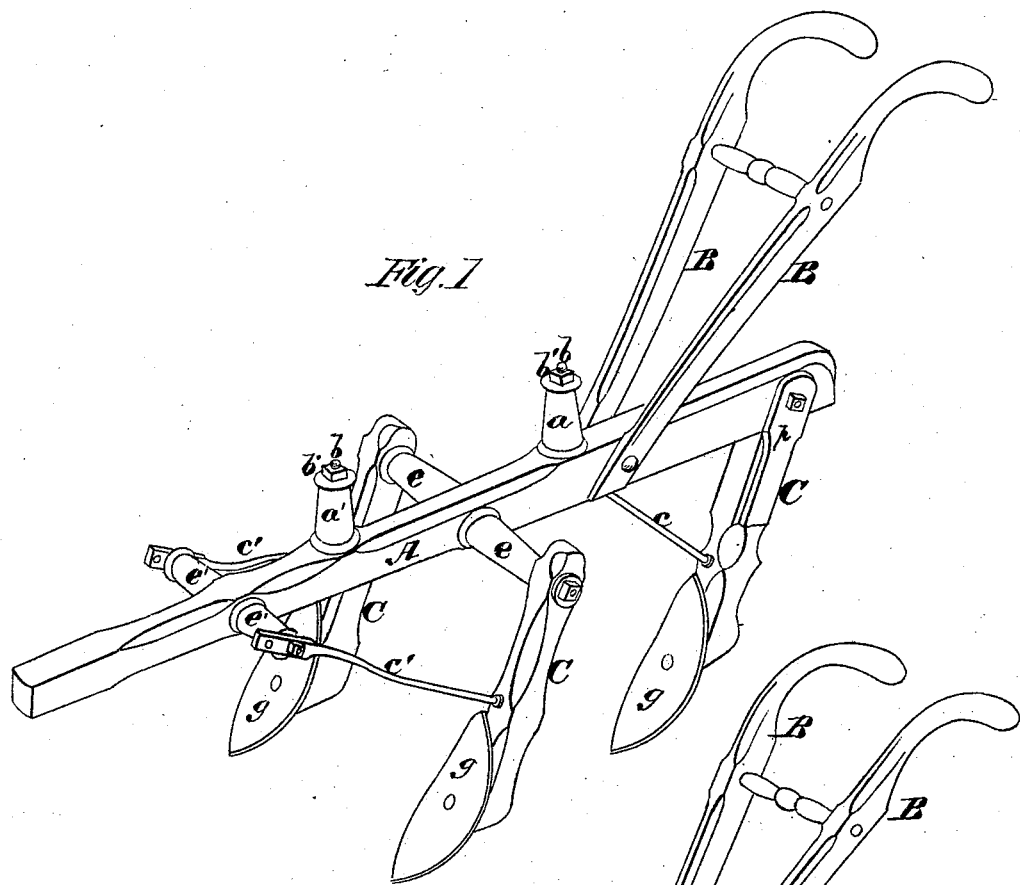
Figure 2:
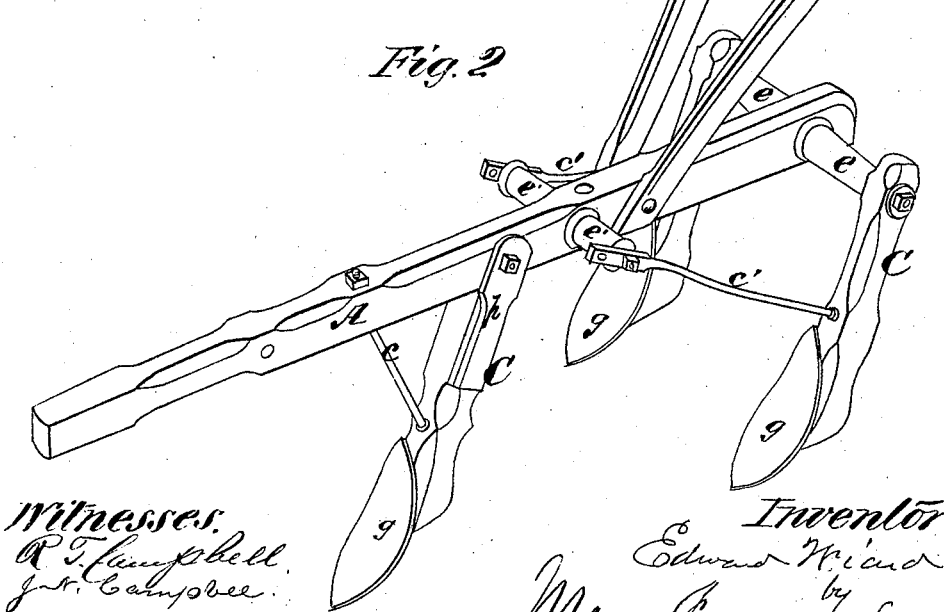

Figure 1, Plate 1, is a perspective view of the cultivator with three shovels, two of which are in front of a single one. Fig. 2, Plate 1, is a similar view of the same parts with one shovel arranged in front of two. Fig. 3, Plate 2, is a perspective view of a single-shovel cultivator. Fig. 4, Plate 2, is a perspective view of a double-shovel cultivator.

Similar letters of reference indicate corresponding parts in the several figures.

The object of this invention is to combine in a single hand cultivator such features as will admit of an interchangeability of shovels, so that the shovels can be used either singly, in pairs, or in threes, at pleasure, as will be hereinafter explained.

The following description of my invention will enable others skilled in the art to understand it.

In the accompanying drawing, A represents the beam of the cultivator. B B are the handles or stiles, and C are the standards, having affixed to them the shovels $g$, which may or may not be reversible. The cultivator shown by Fig. 1 has three shovels attached to it. The rear shovel-standard C is arranged in the same plane as the beam A, and secured to this beam by means of a bolt passed transversely through the beam and through ears $p$ on the said standard. This rear standard C is further secured to the beam A by means of a brace, $c$, and a vertical bolt, $b$, which latter passes through the beam A and through one of several holes made through the brace. The bolt $b$ passes through a post, $a$, and receives a nut, $b'$, on its upper end. The two front shovel-standards C C are secured to the outer ends of two posts, $e\ e$, by means of a long bolt on the ends of which nuts are applied. These front standards C C are further secured to the beam A by means of posts $e'\ e'$, braces $c'\ c'$, and a bolt, which latter passes through the posts $e'\ e'$ and through the beam A, and receives nuts on its ends. In front of the post $a$ is a similar post, $a'$, which, like the rear post $a$, is secured to the beam A by means of a bolt, $b$, and nut $b'$. The shovel-standard C, which, in Fig. 1, is at the rear of the beam A, may be applied at the point where the two posts $e\ e$ of the pair of shovel-standards are attached, and these latter may be applied at the rear of the beam A. Such an arrangement is represented by Fig. 2.

In cultivating crops with the cultivator arranged as in Fig. 2 the earth is thrown by the rear shovels into the furrow made by the front shovel, and trenches or furrows are left alongside of the plants on either side. With the single-caster shovel in rear, as in Fig. 1, the trench or furrow is left at the greatest distance from the plants and the earth is hilled up about their roots.

To form a single-shovel plow the front standards C C are removed, and Fig. 3 is produced. Remove the center standard of Fig. 3 and bolt the other two standards separately to the beam A, one in front of the other, as shown in Fig. 4, and a double-shovel cultivator is produced.

In this kind of cultivator the posts $a\ a'$ may be used to set the standards off from the beam A.

It will be seen from the above description that I obtain a single, a double, or a triple shovel-cultivator, whichever may be required, and use only a single beam; and I so connect the standards to this beam that the different changes can be readily made and the standard or standards, as the case may be, are firmly secured to their beam.

Having described my invention, what I claim as new, and desire to secure by Letters Patent, is—

The cultivator, with the described means for adjustment to carry one, two, or three shovels and to change the same to different positions, as shown in the drawing.

EDWARD WIARD.

Witnesses:
 JNO. C. COONLEY,
 G. A. MILLARD.